United States Patent Office 3,455,388
Patented July 15, 1969

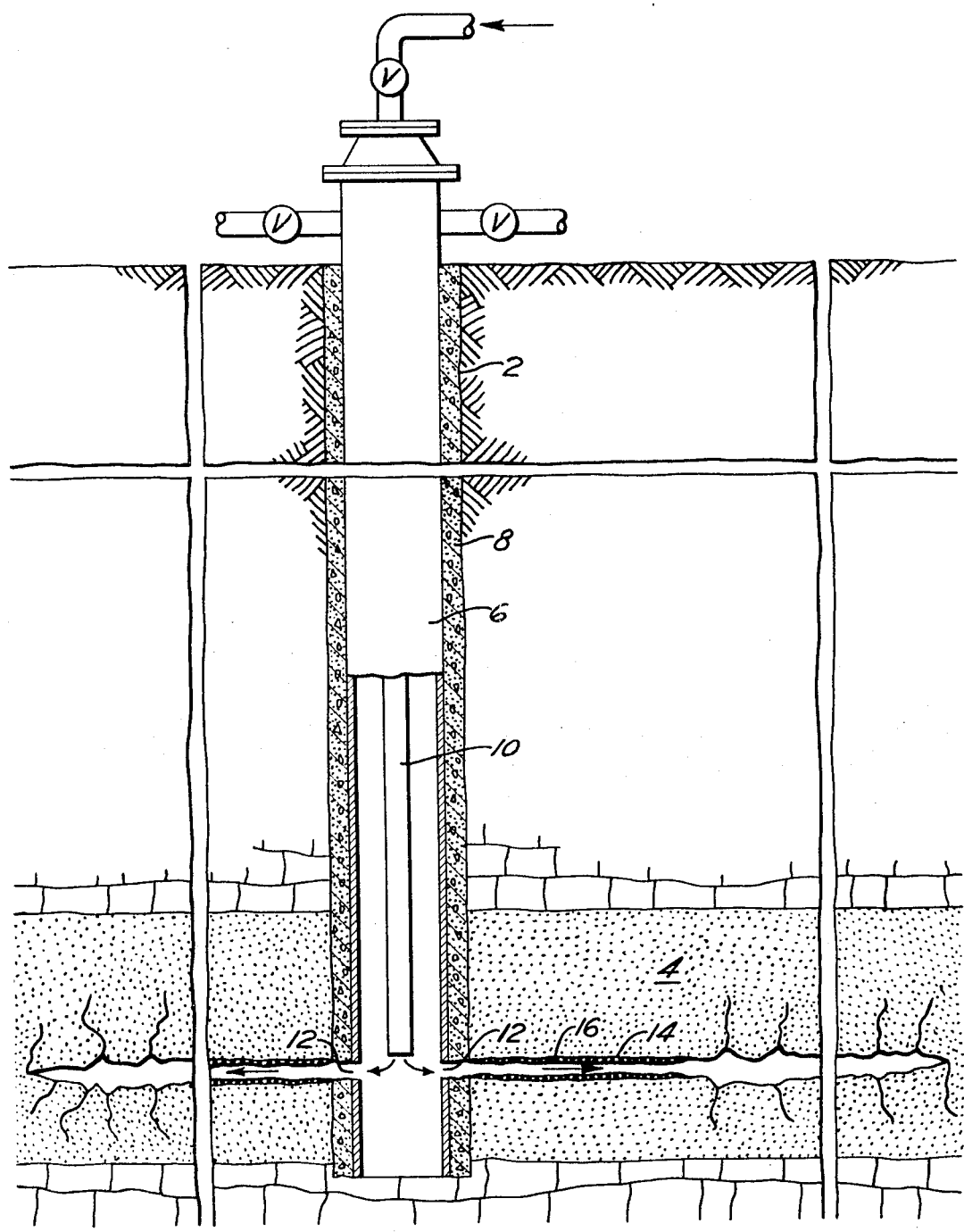

3,455,388
METHOD OF FRACTURING AND ENLARGING THE FRACTURE WITH ACID
Jimmie L. Huitt, Glenshaw, Pa., assignor to Gulf Research & Development Company, Pittsburgh, Pa., a corporation of Delaware
Filed Nov. 10, 1966, Ser. No. 593,364
Int. Cl. E21b *33/13, 43/26*
U.S. Cl. 166—292                             3 Claims

ABSTRACT OF THE DISCLOSURE

A method of increasing the flow capacity of a carbonate formation in which a fracture is initiated in the formation from a well, the faces of the frature adjacent the well are covered with a fluid-loss reducing material, and acid is displaced through the fracture beyond that portion in which the faces are protected with the fluid-loss reducing material. In one form of the invention, gas is dissolved in the fracturing liquid to limit the permeability of the formation adjacent the fracture to liquids, and thereby aid in placing the later injected acid at a substantial distance from the well.

---

This invention relates to a method of forming passages for the flow of fluid through a subterranean carbonaceous formation penetrated by a well bore.

Hydraulic fracturing methods have heretofore been employed to form fluid passages through subterranean carbonaceous formations. Large horsepower requirements, fluid gels and a great deal of expensive equipment and supervision are needed during fracturing operations. In addition, expensive propping agents must be utilized in order to keep the fracture supported in an open position after termination of the fracturing treatment. This method is therefore effective only to the extent that the fracture is maintained in a propped condition. Subsequent propping agent flowback or embedment of the propping agent into the fracture faces often results in closure of the fracture with a resultant decrease of the well's productivity or injectivity.

Acid injection has been previously used to enlarge the volume of the created fractures. These attempts have been relatively unsuccessful owing to the inability to successfully control the reaction rate of the acid. Because of this lack of control, the major portion of the acid reacts with the carbonaceous formation within a few feet of the well bore. A more beneficial result would be produced if the formation is also acidized at great distances from the well bore. Acid reaction at large radial distances from the well bore would function to expose larger volumes of the reservoir rock to an adjacent high capacity open fluid path to the well bore.

This invention resides in a method of hydraulically fracturing carbonaceous formations and enlarging, at remote distances from the well bore, the capacity of the created fractures by controlling the reaction position of the injected acids. In this method a fracture is initiated by pumping a nonacid fluid containing fluid-loss additive into the formation. This fracture initiating fluid, hereafter known as spearhead, filters into the fracture surfaces without reacting with the matrix of the fracture face. The entrained fluid-loss additives are deposited on the fracture faces as the spearhead fluid passes into the matrix thereby sealing these faces and forming a protective filter cake. Acid then passed through the filter cake protected fractures is not in contact with the adjacent carbonaceous formation during acid injection. The injected acid is moved through the sealed portions of the fracture to subsequently react with portions of the fracture, located at large radial distances from the well bore, which are not protected by the filter cake.

In the drawing:
The drawing is a diagrammatic view, partially in vertical section, of a subterranean carbonaceous formation penetrated by a well bore and the subsurface equipment necessary to perform the well treatment method of this invention.

In the drawing a well bore 2 extends downward from the surface of the earth through a subterranean carbonaceous hydrocarbon-containing formation 4. A string of casing 6 is installed within the well bore 2 and, as preferred in this invention, set through the hydrocarbon-containing formation 4. Cement 8 is set in the annulus formed between the casing 6 and the wall of the well bore 2. A string of tubing 10 is installed within the casing 6 and set adjacent perforations 12 formed through the casing 6 and the cement sheath 8.

In the operation of this invention a nonacid fluid spearhead containing a fluid-loss additive is pumped down the tubing 10 and through the perforations 12 at a rate which will break down and initiate a fracture 14 through the formation 4. The nonacid fluid will penetrate the fracture faces and move from the fracture into the formation leaving behind particles of fluid-loss reducing additive. A filter cake 16 will form a temporary fluid seal on the fracture faces as fluid loss continues and fluid-loss additives build up on the fracture surfaces. After a protective filter cake has been formed on the fracture surfaces to a desired radial distance from the the well bore, acid is injected down and the tubing 10, through the perforations 12 and outwardly through the portion of the fracture protected by the filter cake 16. Injection of fluid is continued until the fracture is extended and a portion of the acid reaches a position within the fracture beyond the filter cake 16. Injection is terminated and the well is preferably closed in for at least four hours while the acid reacts with the carbonaceous formation 4.

Effectively establishing a protective filter cake by this invention will permit the operator to position unreacted acid throughout the fracture and at a great distance from the well bore before the acid reacts with the carbonaceous formation. High capacity fractures through a formation function to reduce the pressure required to move fluid through the fracture and to increase the volume of fluid that may be moved by a given pressure. By enlarging the capacity of the fracture at great radial distances from the well bore a wider expanse of reservoir is placed in closer proximity to the well bore access. The well's productivity or injectivity will thereby be substantially increased.

The fracture capacity may also be enlarged throughout the entire radial extent of the fracture by the application of this invention. A complete fracture treatment is accomplished by sizing the spearhead volume, based on reservoir studies, in order that substantially all of the spearhead will filter into the formation during injection. By calculating the capacity of the tubing and not over-flushing the acid into the fracture, the entire fracture volume will be acid filled at the termination of injection. During the well's closed period, the pressure within the fracture is greater than the adjacent formation pressure. Acid positioned within the fracture will gradually leak off through the filter cake and react with the adjacent carbonaceous formation. This acid reaction behind the filter cake will function to dislodge the protective filter cake and permit further acid reaction with the portion of the formation previously protected by the filter cake.

By this procedure acid may be positioned at large radial distances from the well bore without reacting with the first portion of the fracture faces of the carbonaceous formation through which it is transported. Subsequent filter cake destruction during the closed in period will expose the previously protected fracture faces to the acid thereby providing a method of acid treating the fracture faces for the entire radial extent of the fracture.

It is logical that reservoir information will not be available on certain wells desired to be treated by this invention. To assure against excessive premature acid reaction caused by inadequate filter cake formation the operator may, during the acid injection, pump intermittent slugs of nonacid fluid containing fluid-loss additives. These slugs of fluid will filter into the first contacted fracture faces which are taking fluid. A filter cake will thus be formed to protect this area from reacting with subsequent volumes of acid traveling through the fracture.

Additional protection against premature acid reaction may be gained by adding gas to the spearhead fluid. The presence of gas in the spearhead will function to saturate the carbonaceous rock adjacent the filter cake and retard the flow rate into the formation of any acid which may prematurely reach the formation. Examples of gases suitable for injection with the spearhead fluid of this invention are carbon dioxide, exhaust gases, nitrogen, methane or ethane. It is preferred that the amount of gas added to the spearhead be in the range of 50 to 300 standard cubic feet per barrel of spearhead fluid. It is specifically preferred however that at least 50 cubic feet per barrel of spearhead fluid should be used when attempts are made to saturate the formation.

In addition to increasing the flow capacity of the fracture, this invention is also beneficial over a conventional nonacid fracturing techniques because propping agents and gels for holding the propping agents in suspension will not be needed. Carbonaceous formations are heterogeneous in composition and possess varying permeability, mineral composition and acid reaction properties. Owing to these heterogeneous properties the acid will react more readily upon certain portions of the exposed fracture surfaces. As a portion of the surface reacts with the acid and is placed in solution, high points will form on the surface of the fracture faces. As the overburden pressure is subjected upon the fracture after termination of the treatment, these high points will function to hold the fracture in an open position. By eliminating the necessity of injecting gel and propping materials into the fracture a considerable savings in horsepower requirements, equipment, supervision and materials will be realized.

The spearhead of this invention should be a nonacid liquid, preferably water or oil. It is preferred that the volume of this spearhead should represent 10 to 60 percent of the total volume of liquid injected into the well. Commercially available fluid-loss reducing additives such as silica flour, the Adomites, or the asphaltine fluid-loss reducing additives could effectively be used with these fluids. An example of a preferred spearhead for this invention would be .05 pound of silica flour per gallon of water. It should be understood however that these fluid-loss reducing additives are named merely for illustrative purposes. The only fluid-loss reducing additive requirement for this invention is that the additive should function to temporarily seal the fracture faces against the passage of fluid for a period of time sufficiently to pass the acid through the protected zone and to the desired radial distance from the well bore.

It is preferred that a 5 to 20 percent solution of hydrochloric acid be used with this invention. An ideal acid solution would be a 15 percent hydrochloric acid-water solution. This invention should not however be restricted to any particular acid and may conceivably be performed with any acid which will react with the matrix of subterranean carbonaceous formations without subsequently forming emulsions or precipitants which would restrict fluid flow. Carbonaceous formations generally refer to formations containing appreciable amounts of limestone or dolomite.

The radial distance to which the fracture should be protected by the fluid-loss additives and the distance from the well bore at which the acid should be placed in this invention will depend upon the particular well and the reservoir conditions therein. It is preferred however that the fracture surfaces be protected to a distance of at least 10 feet from the well bore and the forward front of the injected acid be moved to a distance of 10 to 100 feet from the well bore before terminating the treatment. After termination of the treatment it is preferred that the well be closed in for at least four hours to assure adequate reaction of the acid with the carbonaceous material of the formation.

By preventing the reaction of acid with portions of the formation near the well bore an operator may greatly increase the productivity or injectivity of a well by the acid fracturing method of this invention. substantial savings of materials, supervision and use of equipment will also be realized over heretofore employed techniques.

Therefore I claim:

1. A method of fracturing a hydrocarbon-bearing formation containing appreciable amounts of limestone or dolomite penetrated by a well bore extending from the surface of the earth downwardly through the formation to be fractured comprising pumping a spearhead liquid containing fluid-loss reducing additive down the well bore and into the formation and increasing the pressure on the liquid to break down the formation and create a fracture, continuing pumping the spearhead liquid down the well bore and into the fracture thereby sealing the faces of the fracture by forming a fluid-loss reducing additive filter cake on the surfaces of the fracture, displacing hydrochloric acid down the well bore and into the fracture at a rate and volume to extend the fracture beyond the sealed faces thereof and fill the fracture with hydrochloric acid from the well to the extremity of the fracture, and closing in the well for at least four hours whereby acid filters through the filter cake on the faces of the fracture to dissolve the formation.

2. A method as set forth in claim 1 in which at least 50 standard cubic feet of gas is dissolved in each barrel of spearhead liquid.

3. A method as set worth in claim 1 in which the fluid-loss reducing additive is silica flour.

References Cited

UNITED STATES PATENTS

| | | | |
|---|---|---|---|
| Re. 23,733 | 11/1953 | Farris | 166—42 |
| 2,699,213 | 1/1955 | Cardwell et al. | |
| 3,022,249 | 2/1962 | Eberhard | 252—8.55 |
| 3,063,499 | 11/1962 | Allen | 166—42 |
| 3,131,146 | 4/1964 | Griffith | 166—42 X |
| 3,167,123 | 1/1965 | Graham et al. | 166—42 |
| 3,172,471 | 3/1965 | Warren | 166—29 X |
| 3,180,414 | 4/1965 | Parker | 166—29 |
| 3,285,340 | 11/1966 | Huitt et al. | 166—42 |
| 3,374,835 | 3/1968 | Knox | 166—42 |

OTHER REFERENCES

Kingston, Benson M.: Acidizing Handbook, Houston, Tex., Gulf Pub. Co., 1936, pp. 30, 31, 37–39.

CHARLES E. O'CONNELL, Primary Examiner

IAN A. CALVERT, Assistant Examiner

U.S. Cl. X.R.

166—308